Figure 2:

July 9, 1963 J. F. CERNESS ET AL 3,096,565
METHOD OF USING A SLIDING SURFACE MATERIAL
FOR SEALS OR BEARINGS
Original Filed Dec. 21, 1956

*INVENTORS*
JOSEPH F. CERNESS
BY DOUGLAS H. STRONG

*Eber J. Hyde*
ATTORNEY

United States Patent Office 3,096,565
Patented July 9, 1963

3,096,565
METHOD OF USING A SLIDING SURFACE MATERIAL FOR SEALS OR BEARINGS
Joseph F. Cerness, East Cleveland, and Douglas H. Strong, Willoughby, Ohio, assignors to Clevite Corporation, Cleveland, Ohio, a corporation of Ohio
Continuation of abandoned application Ser. No. 629,936, Dec. 21, 1956. This application Apr. 10, 1959, Ser. No. 805,480
3 Claims. (Cl. 29—149.5)

This invention pertains to a method of using a particular material in sliding surface engagement, particularly for a seal, a sleeve bearing, a bushing, a piston ring, a valve guide or the like.

This is a continuation of our prior patent application, Serial Number 629,936, filed December 21, 1956, for Sliding Surface Material Especially for Seals or Bearings, filed in the names of Joseph F. Cerness and Douglas H. Strong, which prior application is now abandoned.

For a number of years there has been a critical need for an improved sliding surface bearing and seal material which will withstand high temperature operation as well as low temperature operation, and which will withstand the thermal shock incident to starting cold (about −67° F.) and warming up to a high ambient temperature in a time period of about one minute, and which will thereafter run for a long period of time at the elevated temperature, particularly in the absence of externally applied oil or grease. These criteria, coupled with the other requirements for a good seal and bearing material have resulted in many, many different materials failing to perform satisfactorily.

The use of the material of the present invention fulfills to a very large degree all of the requirements for both a sliding surface seal material and a sliding surface bearing material, and is admirably suited to high temperature operation starting from a temperature well below zero, with and without external lubrication.

An object of the invention is the provision of a new method of using a particular material as an improved sliding surface material, preferably for operation against a similar material, and in some instances against a dissimilar material, particularly in the high temperature range but capable of starting at temperatures well below 0° F.

Another object of the invention is the provision of a method of using a sliding surface material, such as a seal or bearing material, which is tough, resists wear and corrosion, which resists thermal shock, whose thermal expansion approximates that of steel, whose heat conductivity is good, whose porosity is low, and which is inexpensive and can be machined, which has to a certain degree the ability to imbed dirt particles, which will operate for short periods of time at very low temperatures, and which will withstand long periods of operation in ambient temperatures of about 1100° F., all of the above without external lubrication, and which is also suitable for use with external lubrication.

A further object of the present invention is the provision of a method of using a sliding surface material which will withstand a number of low temperature starts and which will operate continuously at temperatures about 1100° F. without external lubrication.

Still another object of the invention is to provide a method of using a sliding surface material, particularly in engagement with similar material, over a short period of time in an ambient temperature of 1200° F. without external lubrication.

For a better understanding of the present invention, together with other and further objects thereof, reference is had to the following description taken in connection with the accompanying drawings, and its scope will be pointed out in the appended claims.

In the search for better seal materials a list of ten desirable properties has been used as a criterion to judge the relative merits of the materials tested. The desirable properties are as follows:

(1) Wear resistance: preferably the material should not wear at all, but if it does it should wear at a low, uniform rate and it should not gall or seize.

(2) Toughness: the material should be strong without brittleness since excessive fragility hampers engine assembly as well as increasing the probability of operating failure.

(3) Corrosion and oxidation resistance: the material should resist oxidation and corrosion by air, oil and fuel products even at sustained high temperatures.

(4) Thermal shock resistance: the material must resist fracture or damage by extremely fast heating rates found in gas turbine engines.

(5) Thermal expansion of the material should match as closely as possible the expansion rates of its surrounding parts, such as the shaft and housing.

(6) Heat conductivity should be good to conduct away the heat established by friction in the seal and to maintain the seal temperature as low as possible even at very high surface speeds.

(7) Weight: should weigh as little as possible since weight is at a premium in aircraft.

(8) Porosity: should be as low as possible.

(9) Machinability: should be machinable by standard practices.

(10) Economics should be moderate in cost and contain no strategic materials.

It will be seen from this list that the requirements for a good seal material are quite severe.

In the past one of the best combinations for a gas turbine oil seal has been chrome plate operating against carbon graphite materials. This combination, however, has had important limitations which restrict its use in present and future aircraft. The carbon-graphite lacks oxidation resistance when operated above 700 to 800° F., and it is quite fragile and brittle. Also, the chrome begins to soften at temperatures about 500° F. In spite of this, and because better materials have been lacking, the carbon-graphite chrome seal has achieved considerable success even though it is quite expensive to fabricate, due in part to the brittleness of the carbon-graphite.

An outstanding use has been discovered for a material which to a very large degree fulfills all of the ten requirements of a good high temperature seal material, and which, in addition has to a very large degree several extra properties which make it admirably suited as a sliding surface bearing material particularly for use at temperatures above about 600° F. This material, when rubbed against itself has a very low coefficient of friction, with and without external lubrication, and has to a certain degree the ability to imbed dirt particles.

Its low coefficient of friction when rubbed against itself is a great advantage in a seal material since in a gas turbine the high surface speeds of the seal tend to generate considerable heat, and of course the lower the coefficient of friction the less heat is generated and the less power is consumed.

This outstanding sliding surface material consists essentially of the following:

| | Percent |
|---|---|
| Carbon | about .87 |
| Silicon | about .25 |
| Manganese | about .25 |
| Chromium | about 4.00 |
| Vanadium | about 1.90 |
| Molybdenum | about 8.00 |
| Iron | Balance |

Sliding surfaces made of the above material have been successfully tested sliding against similar surface material in dry air, and without external lubrication. The relative surface speed of two engaging parts during the test was 156 feet per second; loading between the rubbing surfaces was 18 pounds per square inch; and ambient temperatures ranged up to 1200° F. with the sliding surface temperatures ranging from 800° F. to 2000° F.

The outstanding combination for sliding surface contact at high temperatures, for seal or bearing application, was achieved by a piece of the aforedescribed material machined from annealed stock rubbing against a piece of the same material. This combination operated 5 hours continuously at ambient temperatures of 1100° F. or slightly higher, with surface contact temperatures reaching 1350° F. or slightly higher. No lubricating material was used, other than the inherent lubricating ability of the material itself. The average wear of the two relatively rotating parts due to friction was only .0004 inch per hour over the 5-hour period, and the average coefficient of friction was .06. It is considered that this is an outstanding performance.

In another substantially similar test the ambient temperature was 1200° F., and it is estimated that the temperature of the rubbing surfaces reached about 2000° F. The average coefficient of friction was .07; wear on the rotor varied from a pickup of .0008 to a loss of .0008, and the stator tended to pick up material from the rotor. Under these extreme conditions the material operated successfully for about 30 minutes, sufficient for many present day one-shot devices.

A test run with the same material but hardened to Rockwell C 50-55, at an ambient temperature 820° F. and with surface contact temperature of 1200° F., showed an average wear rate of only .00065 inch per hour over a 5-hour test, and an average coefficient of friction of .057. Both of these aforesaid tests were without external lubrication.

A test run with the hardened material in contact with the unhardened, or annealed, material showed a satisfactory wear rate for both parts, but the average coefficient of friction was about twice the average coefficient of friction when the annealed material was rubbed against itself or the hardened material was rubbed against itself.

Since the sliding surface material of this invention is an iron base alloy containing about 85% iron, its coefficient of thermal expansion very closely matches the coefficient of thermal expansion of its surrounding steel parts. It is basically a tough tool steel, but can be machined with carbide tools. No strategic metals are in the alloy and its heat conductivity, while not extremely high, is satisfactory. It is not porous, its density is moderate, but because it is non-porous, strong and tough, a smaller amount of this new material will replace a large amount of presently used carbon which is relatively weak and quite brittle. Consequently, even in aircraft use the greater density of this material compared to carbon is considered to be inconsequential. Outstanding characteristics of this new sliding surface material are its wear resistance, its low coefficient of friction against itself at elevated temperatures, its toughness and its abiity to withstand physical abuse and extreme thermal shock, and its ability to operate without external lubrication. To date it has shown quite good resistance to oxidation and corrosion at elevated temperatures over modest test periods, but in the event this quality proves to be lower than desired, in some applications coatings of known corrosion and oxidation resisting materials may be applied to the non-sliding surface portions thereof. All of these factors, taken in conjunction with the cost of this material which, when machined into finished seal and sliding surface bearing parts, is low compared to present day materials, indicate that this is a most outstanding material, one which will greatly reduce the cost of present day seals and which will extend their temperature range considerably, and which will greatly extend the temperature range of sliding bearings.

With reference to the single sheet of drawing there are shown several of the typical sliding surface uses of the material of this invention. In addition, other sliding surface uses such as piston rings, the bore of a cylinder etc., may be thought of.

Figure 1:
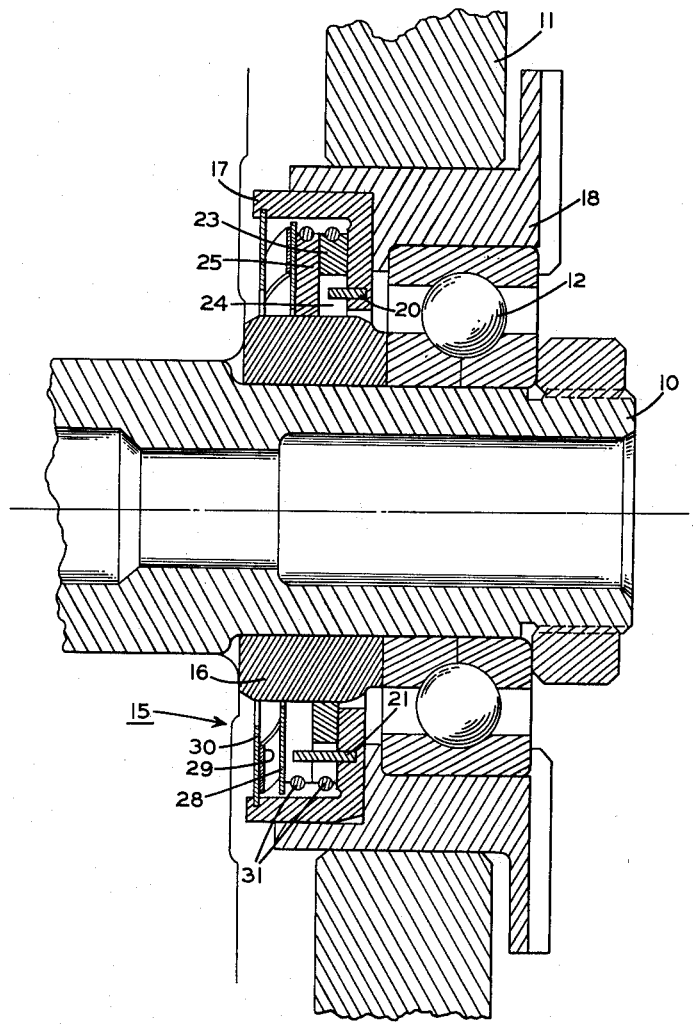

In FIGURE 1 there is shown a seal between a rotating shaft 10 and a stationary member 11. A sliding surface bearing 12 is located between the relatively rotating parts, and the seal device is shown generally by the reference character 15.

The seal 15 comprises a ring 16 secured in tight relationship to the shaft 10 and made of the material of this invention. Member 16 rotates with the shaft 10.

A cup-shaped member 17 is held fixed with respect to the stationary member 11 by means of the flanged ring 18 and it carries several locating pins 20, 21. Member 17 may be made of the material of this invention because of thermal expansion problems, but it is not essential.

Three sealing rings 23, 24 and 25 are mounted between the ring 16 and the cup-shaped member 17. Each of these rings is formed of the material of this invention. Ring 23 is mounted around ring 24, radially outwardly therefrom, and ring 24 is mounted in sealing engagement with the ring member 16. Relative rotation takes place between ring member 16 and the sealing ring 24.

The ring 23 is pinned to the cup-shaped retaining member 17 by pin 21, and sealing ring 24 is pinned by pin 20 so that they are constrained against rotation. Each of these sealing rings 23, 24 has an expansion gap into which the pins extend, thereby preventing relative rotation between the sealing rings with consequent lining up of the expansion gaps to the detriment of the seal.

Sealing ring 25 is placed axially adjacent sealing rings 23, 24 and has an expansion gap into which the pin 21 extends. A retaining ring 28 is held against ring 25 by spring 29, and a snap ring 30 secured to member 17 holds the spring in place. Garter springs 31 hold the sealing rings 23, 24, 25 in sealing engagement against the ring 16. Relative rotation takes place between the seal 15 and the ring 16. Consequently the parts thereof which are in contact with a relatively rotating member should be made of the material of this invention. They are the ring 16 secured to the shaft 10 and the sealing rings 23, 24 and 25.

Figure 3:
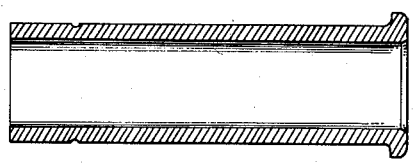

FIGURE 2 shows a flanged sleeve bearing, and FIGURE 3 a valve guide made of the material of this invention.

While the method of the present invention reaches its greatest usefulness and its most outstanding qualities when the sliding surface material is rubbed against itself, the method may also be practiced by rubbing the material, with or without external lubrication, against materials such as nitrided steel, carburized steel, ductile iron, or SAE 52100 which is a known steel material consisting of 1.3 to 1.6% chromium, .95 to 1.1% carbon, .2 to .35% silicon, .25 to .45% manganese, and a maximum of about .025% phosphorus and .025% sulphur.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. The process of making a sliding surface seal or bearing which comprises the step of forming a body of an alloy consisting essentially of:

| | Percent |
|---|---|
| Carbon | .87 |
| Silicon | .25 |
| Manganese | .25 |
| Chromium | 4.00 |
| Vanadium | 1.90 |
| Molybdenum | 8.00 |
| Iron | Balance | and forming on said body a surface for rubbing engagement with another body.

2. The process as set forth in claim 1 further characterized by forming said other body of an alloy consisting essentially of:

| | Percent |
|---|---|
| Carbon | .87 |
| Silicon | .25 |
| Manganese | .25 |
| Chromium | 4.00 |
| Vanadium | 1.90 |
| Molybdenum | 8.00 |
| Iron | Balance |

3. The process as set forth in claim 1, further characterized by forming said other body of material selected from the group consisting of SAE 52100, nitrided steel, carburized steel and ductile iron.

References Cited in the file of this patent
UNITED STATES PATENTS

| 1,747,394 | Scott | Feb. 18, 1930 |
| 2,086,681 | Scott | July 13, 1937 |
| 2,325,088 | Wright | July 27, 1943 |
| 2,592,277 | Hammer | Apr. 8, 1952 |

OTHER REFERENCES

"Tool Steels" by James Presley Gill et al., published by A.S.M., Cleveland, Ohio, 1944.

Metal Handbook A.S.M. (1948).

Metal Progress A.S.M. (1948).